(12) United States Patent
Shapiro (10) Patent No.: US 6,863,297 B2
(45) Date of Patent: Mar. 8, 2005

(54) FOLDING WALKING OR JOGGING STROLLERS AND CARGO CARRIERS INCLUDING PIVOTING WHEEL AXLES

(76) Inventor: Richard N. Shapiro, 1668 Dey Cove, Virginia Beach, VA (US) 23454

( * ) Notice: Subject to any disclaimer, the term of this patent is extended or adjusted under 35 U.S.C. 154(b) by 81 days.

(21) Appl. No.: 10/346,112

(22) Filed: Jan. 17, 2003

(65) Prior Publication Data

US 2003/0102654 A1 Jun. 5, 2003

Related U.S. Application Data

(63) Continuation-in-part of application No. 10/143,831, filed on May 14, 2003, now abandoned, which is a continuation-in-part of application No. 09/604,769, filed on Jun. 28, 2000, now Pat. No. 6,581,945.

(51) Int. Cl.[7] .................................................. B62B 7/08
(52) U.S. Cl. ....................... 280/646; 280/642; 280/644; 280/650; 280/658
(58) Field of Search ............................. 280/642, 643, 280/644, 650, 30, 47.38, 647, 649, 657, 658, 47.4, 33.993, 646, 62

(56) References Cited

U.S. PATENT DOCUMENTS

| | | | | |
|---|---|---|---|---|
| 1,482,146 A | * | 1/1924 | Pomilio ....................... 280/644 |
| 3,689,099 A | * | 9/1972 | Patterson ...................... 280/38 |
| 4,632,409 A | * | 12/1986 | Hall et al. ..................... 280/30 |
| 5,344,171 A | * | 9/1994 | Garforth-Bles ........... 280/415.1 |
| 5,421,597 A | * | 6/1995 | Berner ........................ 280/204 |
| 5,599,033 A | * | 2/1997 | Kolbus et al. .............. 280/204 |
| 5,647,601 A | * | 7/1997 | Potter et al. ............. 280/47.38 |
| 5,887,889 A | * | 3/1999 | Andrus ........................ 280/647 |
| 6,056,306 A | * | 5/2000 | Rust et al. ................... 280/204 |
| 6,220,611 B1 | * | 4/2001 | Shapiro .................... 280/47.34 |
| 6,325,406 B1 | * | 12/2001 | O'Shea et al. .............. 280/642 |
| 6,402,186 B1 | * | 6/2002 | Garland ...................... 280/647 |
| 6,416,077 B1 | * | 7/2002 | Chen et al. ................. 280/642 |
| 6,533,311 B2 | * | 3/2003 | Kaneko et al. ............. 280/647 |
| 6,561,536 B2 | * | 5/2003 | Suzuki ........................ 280/642 |
| 6,581,945 B1 | * | 6/2003 | Shapiro ........................ 280/30 |
| 2002/0163163 A1 | * | 11/2002 | Shapiro ...................... 280/643 |
| 2003/0102654 A1 | * | 6/2003 | Shapiro ...................... 280/650 |

* cited by examiner

*Primary Examiner*—Christopher P. Ellis
*Assistant Examiner*—J. Allen Shriver

(57) ABSTRACT

A fold flat walking or jogging stroller is disclosed, which includes at least three wheels which all include pivoting wheel support units. The wheel support units include, in various embodiments, simple manually manipulable methods to latch each wheel in the operative or stowed flat positions, which effectively allows the device to fold to a flat profile without any wheel being detached. Associated innovations include a pivoting or floating transverse axle replicating unit, which pivots and latches to replicate a typical fixed wheel axle, but conveniently pivots to a fold flat stowed position. The innovations may also be applied to miscellaneous other types of wheeled carrier devices besides strollers, such as gurneys, golf bag carriers, and hunting game carriers as several examples.

66 Claims, 10 Drawing Sheets

FOLDING WALKING OR JOGGING STROLLERS AND CARGO CARRIERS INCLUDING PIVOTING WHEEL AXLES

RELATIONSHIP TO OTHER APPLICATIONS

This application is a continuation-in-part of U.S. application Ser. No. 10/143,831, filed on May 14, 2002 now abandoned which is itself a continuation-in-part of U.S. application Ser. No. 09/604,769, filed on Jun. 28, 2000 now U.S. Pat. No. 6,581,945.

Previous U.S. applications by the same inventor include Ser. No. 09/271,274 filed on Mar. 17, 1999, now U.S. Pat. No. : 6,220,611, granted Apr. 24, 2001, as well as Shapiro's continuation-in-part U.S. patent application Ser. No.: 09/604,769, filed on Jun. 28, 2000, and finally, U.S. application Ser. No. 10/143,831, filed on May 14, 2002.

FIELD OF THE INVENTION

The present invention relates to folding, compact walking or jogging stroller devices, generally utilized for transporting children, whether including pneumatic or non-pneumatic tires, as well as cargo carriers of miscellaneous types designed to move cargo and loads. While the preferred embodiments focus on strollers, the inventions are equally applied to wheeled cargo carriers, including, but not limited to cargo carriers, golf bag carts, gurneys, hunting/game carriers, as several examples.

BACKGROUND OF THE INVENTION

In continuation-in-part of U.S. application Ser. No. 10/143,831, filed on May 14, 2002, as well as prior continuation-in-part U.S. application Ser. No. 09/604,769 filed on Jun. 28, 2000, disclosures were made relating to compact, folding walking or jogging strollers. Innovations in the prior-referenced applications related to the adaptation of pivoting wheel axles and methods for folding the pivoting wheel axles into a plane defined by the side elevational profile of the frame of the device. Other significant innovations related to the manner in which the forward wheel is manipulated and stowed, methods to allow for rotation or fixation of the forward wheel, methods for latching and releasing all pivoting wheel axles in operative and stowed positions, various methods relating to the flexible seat fabric, and innovative transverse axle replicating units, and rear wheel support units. This continuation-in-part application expands on the variations of carrier devices to which the innovations may be applied.

SUMMARY OF THE INVENTION

This application is a continuation-in-part of the application discussed above, and provides further refinements relating to: methods to latch and release the forward wheel into an operative and stowed position, methods to latch and release the rear wheels of the stroller device and to stow same substantially within the side elevational profile of the stroller frame, methods to provide automatic, reciprocating, or rotational action between various components of the rear wheel axle and frame components, alternative embodiments that provide for automatic folding and pivoting of said rear wheels and rear wheel component parts when the user manipulates a portion of the components and other related innovations that will become obvious by virtue of the disclosures herein.

Further features and advantages of the present invention will be set forth in, or apparent from, the detailed description of preferred embodiments thereof which follows.

BRIEF DESCRIPTION OF THE DRAWING

FIG. 4-A is a side elevational perspective with the forward wheel in an intermediate position;

FIG. 4-B is a side elevational perspective with the forward wheel in a second intermediate position;

FIG. 4-C is a side elevational perspective with the forward wheel in a completely stowed position;

FIG. 4-C is a side elevational perspective with the forward wheel in a completely stowed position;

FIG. 5-A is a side elevational profile perspective with the forward wheel in an operative position;

FIG. 5-B is a side elevational perspective of the stroller with all wheels erected, however, with rear axle components in an intermediate, not fully erected position;

FIG. 5-C is an end elevational perspective of the stroller in a completely erected position, omitting the flexible fabric seat material;

FIG. 6-A is the first of four figures is a series of figures showing an end elevational perspective of the pivoting and folding process involving the rear wheels of the stroller device;

FIG. 6-B is the second of four figures is a series of figures showing an end elevational perspective of the pivoting and folding process involving the rear wheels of the stroller device;

FIG. 6-C is the third of four figures is a series of figures showing an end elevational perspective of the pivoting and folding process involving the rear wheels of the stroller device;

FIG. 6-D is the fourth of four figures is a series of figures showing an end elevational perspective of the pivoting and folding process involving the rear wheels of the stroller device;

FIG. 7-A is one of series of four side elevational, cross sectional views, indicating a sequence of process of the pivoting rear wheel lateral axle latching process wherein said component latches with a portion of the rear wheel pivoting axles;

FIG. 7-B is one of series of four side elevational, cross sectional views, indicating a sequence of process of the pivoting rear wheel lateral axle latching process wherein said component latches with a portion of the rear wheel pivoting axles;

FIG. 7-C is one of series of four side elevational, cross sectional views, indicating a sequence of process of the pivoting rear wheel lateral axle latching process wherein said component latches with a portion of the rear wheel pivoting axles; and FIG. 7-D is one of series of four side elevational, cross sectional views, indicating a sequence of process of the pivoting rear wheel lateral axle latching process wherein said component latches with a portion of the rear wheel pivoting axles.

DESCRIPTION OF THE PREFERRED EMBODIMENTS

Figure 1:
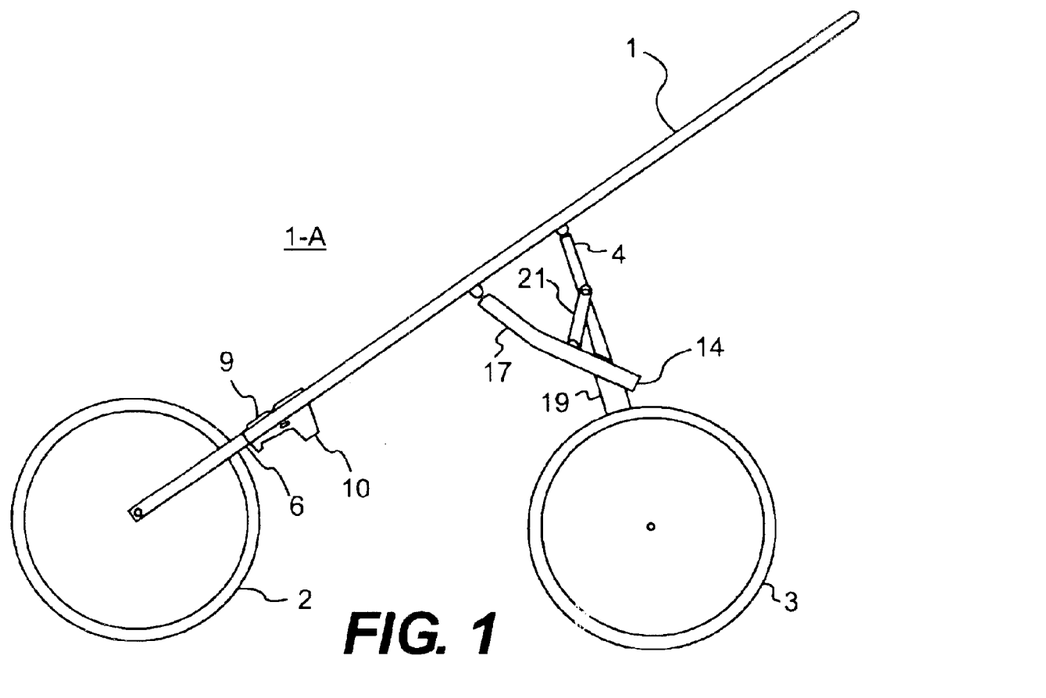
FIG. 1 is a side elevational view of the stroller 1-A.
Figure 2:
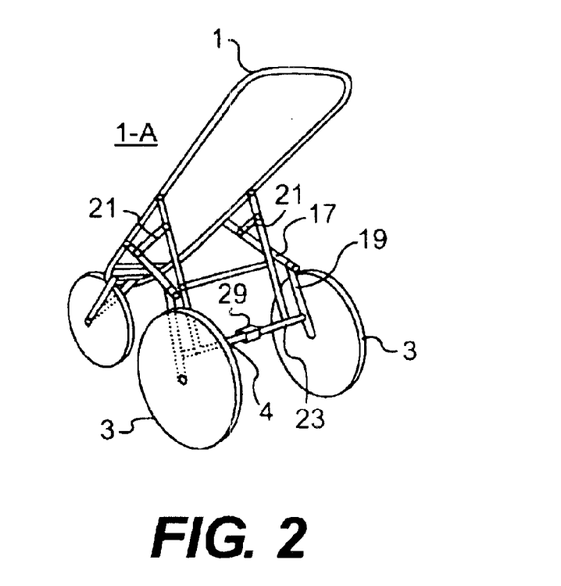
FIG. 2 is a rear elevational perspective of the stroller in an operative position.
Figure 4A:
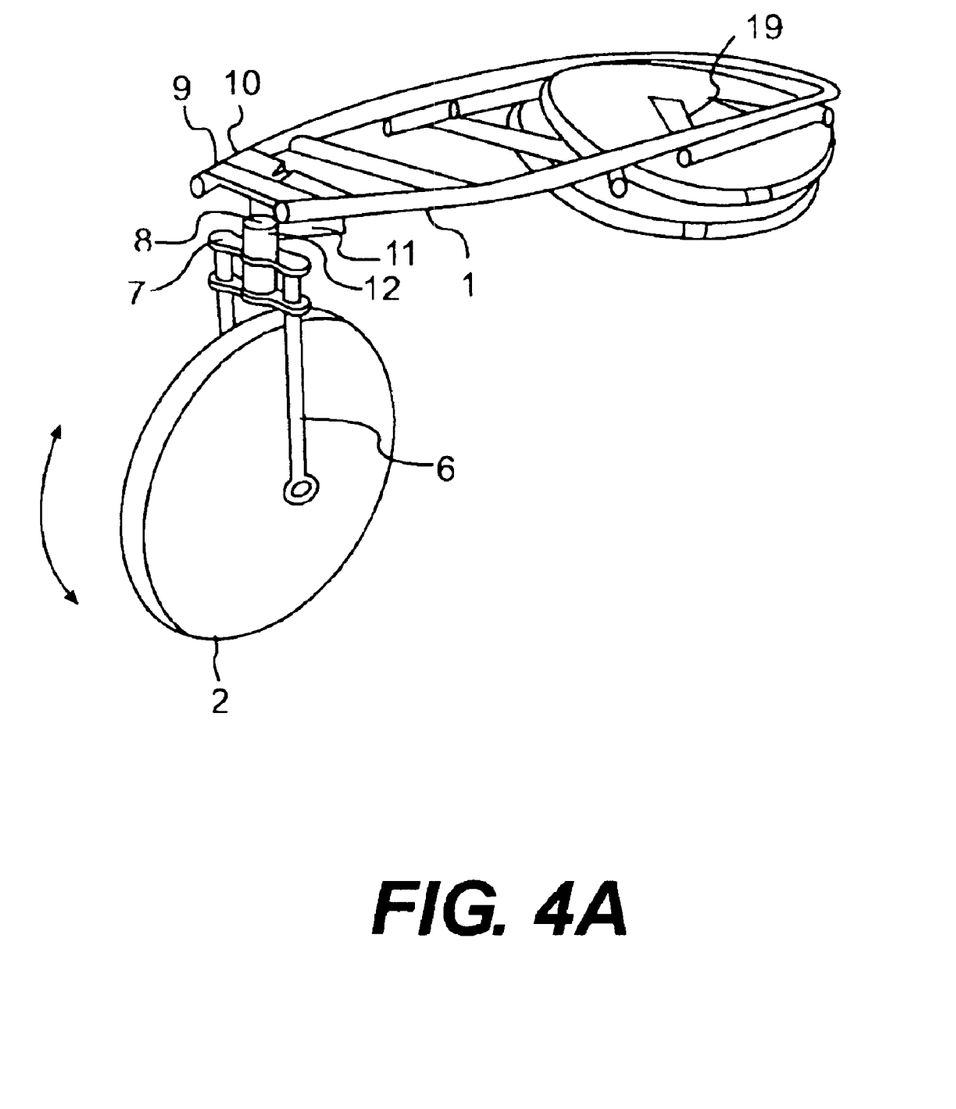
Figure 4B:
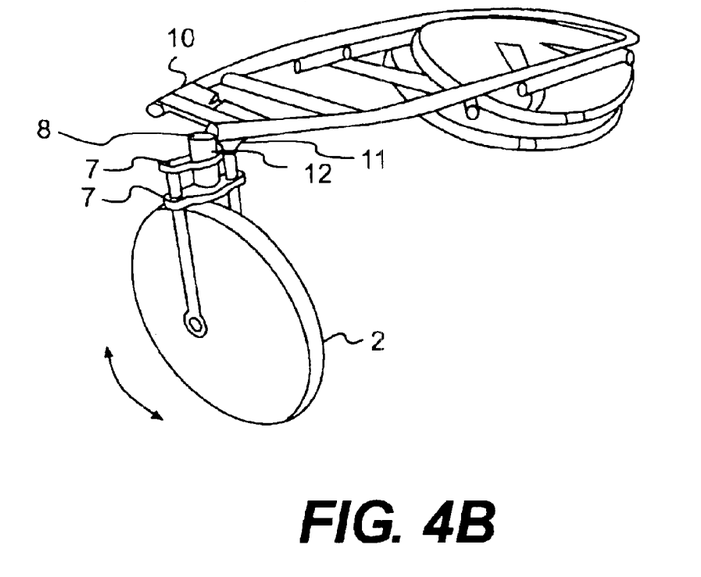
Figure 4C:
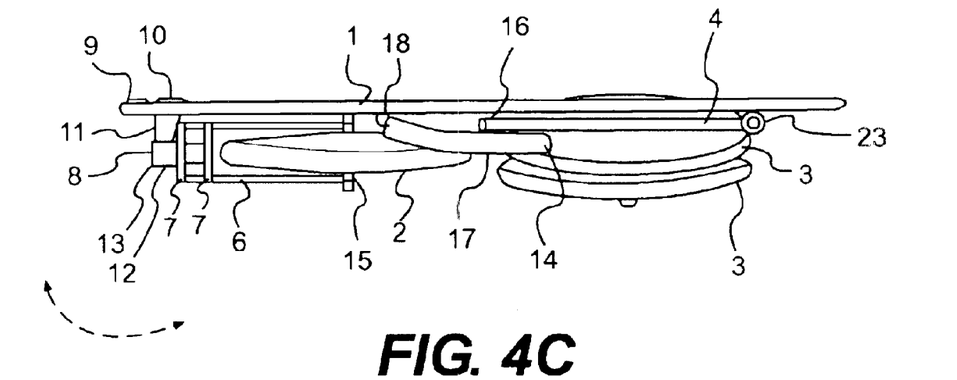

Referring to the drawings, FIGS. 1 and 2 show a stroller device, generally denoted as 1-A, in an operative position (for reference, the stroller device 1-A is shown in a completely stowed position in FIG. 4-C). Referring to FIGS. 1 and 2 particularly, the stroller device is shown in the operative position with a pair of rear wheels (3) and a forward wheel (2). Describing the rear wheel components first, a movable rear wheel support arm (17) is pivotally mounted to the fixed frame (1) in two locations. Two other components are mounted to the said movable rear wheel support arms (17), those components being a rear wheel pivoting axle (19), and additionally an interconnection arm (21). Rear wheel pivoting axle component (19) at one end pivots along the movable rear wheel support arm (17) and at its other termination point is the axle which travels through the center of the rear wheel (3) which provides rolling support to the device. A second rear wheel component is pivotally mounted to the fixed frame (1), that being the pivoting (floating) rear wheel lateral axle (4). The pivoting/floating rear wheel lateral axle innovation is shown in FIG. 2, and at its lateral extremities most remote from the fixed frame interconnects with both of the rear wheel pivoting axles (19), by virtue of a pair of pivoting rear wheel axle connectors (23) (See FIG. 5-C), which positively latch with rear wheel pivoting axle reception cavities (25) (not shown here, shown in a series of FIGS. 7-A through 7-D). Referring particularly to FIG. 1, the forward wheel components primarily include the forward wheel fork (6), the fixed frame forward wheel stop/brace (9), and the frame footrest (10). It is understood that the flexible seat fabric (26) and flexible seat fabric retaining members (27) are not shown in these figures, but that said stroller device will include these components in actual construction (See FIG. 5-C).

Figure 3:
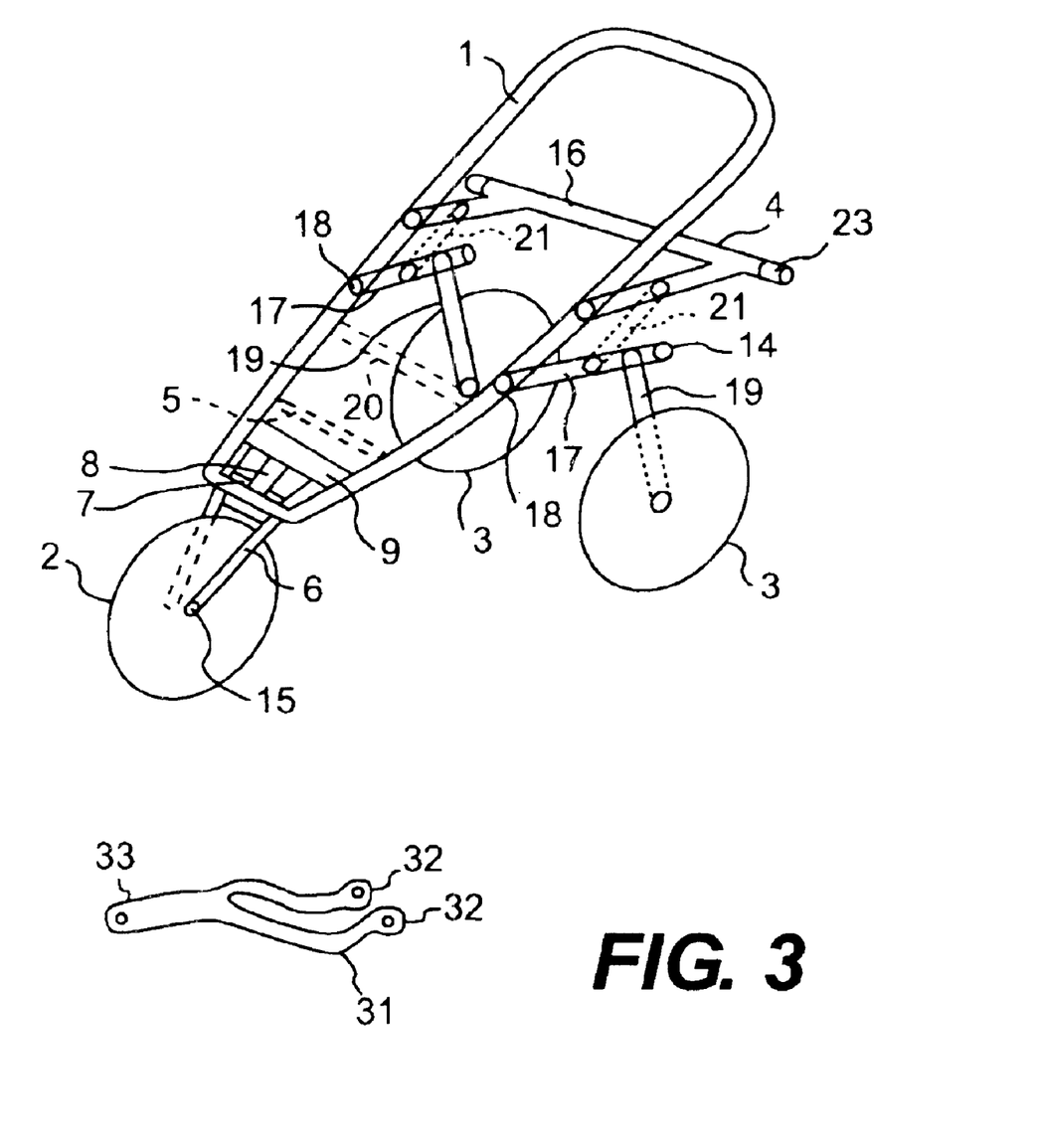
FIG. 3 is a side perspective of the stroller 1-A with the pivoting rear wheel lateral axle in a n an intermediate position.

Referring to FIG. 3, this figure provides further perspective on the folding operation of the stroller device 1-A. Particularly this figure shows the pivoting rear wheel lateral axle (4) in motion, in the midpoint of its pivoting motion. The lateral axle (4) includes the pivoting rear wheel lateral axle connectors on either end of the lateral portion of the component which interconnects to the rear wheel pivoting axles (19), however, in this view, said pivoting rear wheel lateral axle has been released, by motion of the user (not shown), and is in intermediate position showing that this component pivots along the fixed frame lateral axle mounting member (16) and ultimately the pivoting rear wheel axle (4) stows flush with fixed frame (1). This figure in perspective shows several other components including the fixed frame lateral brace (5), which may be in a different position or similar to that shown in FIG. 3, the movable rear wheel support (17), mounting members (18) along which the movable rear wheel support arms (17) are mounted. A pair of movable rear wheel support arms (17) are interconnected by virtue of a movable rear wheel support lateral brace (20). Additionally, at the rearmost opening point of the movable rear wheel support arms (17) is a spring-biased button (14). Each push button (14) allows the user to pivot the rear wheels (3) 90° between the stowed and operative positions. As can be seen in FIG. 3, the interconnection arm (21) has the purposeful effect of causing the rear wheels, which are mounted on the movable rear wheel support arms (17), as well as the rear wheel pivoting axles (19), to retract generally away from the fixed frame (1), at such time as the user grasps the pivoting rear wheel lateral axle (4) and pivots it away from its flush profile with the fixed frame (1). According, the motion of the pivoting rear wheel lateral axle pivoting downward in the direction toward the ground, causes overall movement of the movable rear wheel support arm to pivot along its mounting member (18) by virtue of the interconnection arm (21). The interconnection arms (21) are pivotally mounted by virtue of pins (22).

Last, referring further to FIG. 3, is shown a forward fork trailing bracket accessory (31). This is an accessory which would permit the stroller device to be interconnected to another vehicle such as a bicycle or other wheeled propelled device that is not shown. The user would remove the forward wheel (2) shown in FIG. 3 by releasing it from the forward wheel fork tire mount (15). Using the same mounting bolt (15), the user would engage the bracket accessory (31) through the mounting holes (32) and then the bolt (15) is rethreaded through the forward wheel fork (6). Any other suitable portion of the forward wheel trailing bracket accessory (31) may be affixed to a portion of a mounting accessory on the other propelled vehicle (not shown in FIG. 3) and a suitable portion of the bracket accessory (31) may be mounted at a point similar to the vehicle mounting hole (33) shown on the bracket (31). In this fashion the stroller device may be propelled behind any vehicle.

Referring to the series of FIGS. 4-A through 4-C, a method whereby the forward wheel moves from an operative position to a stowed position is depicted. Before referring to the sequence of FIGS. 4-A through 4-C, initial reference to FIG. 3 shows the forward wheel fork (6) as well as wheel fork cross braces (7) in latched position on the device fixed frame forward wheel stop/brace (9) as well as frame footrest (10), and referring now to FIG. 4-A, it is indicated that the frame footrest (10) mounted to the fixed stroller frame (1), includes a downwardly projecting pivot bracket (11) which may be formed from two extensions of the frame footrest (10) although any suitable arrangement may be employed to create a pivoting mount for the forward wheel fork (6). In FIG. 4-A, the rear wheels are already in a stowed position, and the forward wheel (2) has been unlatched by virtue of forward wheel fork spring biased release button (8) incorporated into a suitable portion of the forward wheel fork pivot head (12). The forward wheel fork (6) includes one or more suitable lateral braces (7). Fixed frame forward wheel stop/brace (9) serves as a movement stop against which the forward wheel fork (6) and its cross braces (7) align when the forward wheel is in the completely latched, operative position (See also FIG. 3). Once the forward wheel fork (6) is freed by virtue of the user pressing the spring biased release button (8), the user may pivot the forward wheel (2) in its same plane, down and away from its operative position in one axis, and then the user, as shown in FIG. 4-B, pivots the forward wheel (2) 90° in a second axis, and once the wheel is pivoted 90° in the second axis, the user may further continue the motion of the forward wheel (2) pressing it up and under until the forward wheel (2) is in a plane parallel with the stroller fixed frame (1) adjacent to said fixed frame (1), until said wheel lies substantially within the perimeter or profile of said fixed frame, at which time the spring biased release button (8) causes re-latching of the forward wheel (2) and its general components, close to or substantially within the side elevational profile of the strolling device as shown in FIG. 4-C. It is also noted that the forward wheel (2) when stowed in this fully latched and stowed position is prevented from fully pivoting or general rotation as a portion of the forward wheel fork (6) and/or its cross braces (7) are trapped within the confines of a suitable portion of the forward wheel stop (9), and frame footrest (10). For the user to take the forward wheel (2), from the stowed position, the operation would be reversed by the user first pressing the spring biased release button (8).

Figure 5A:
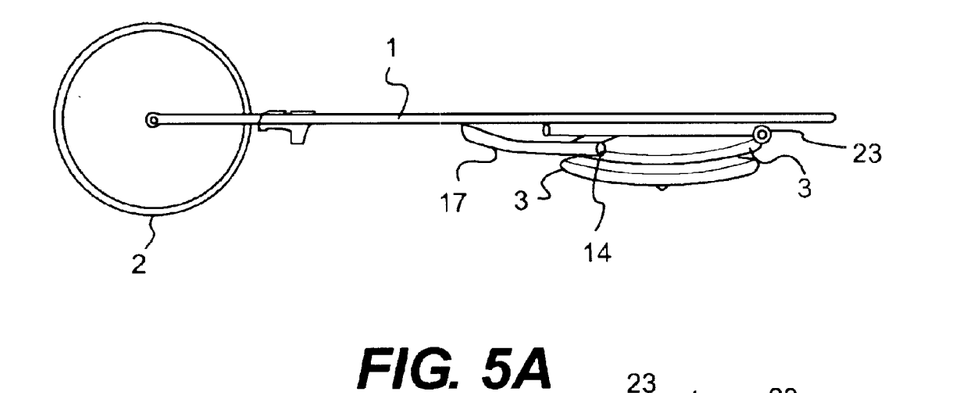
Figure 5B:
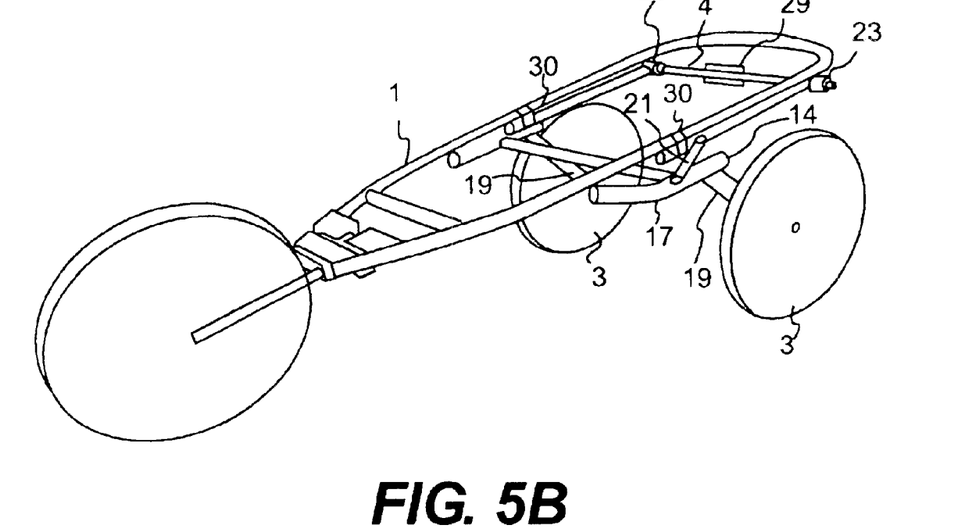
Figure 5C:
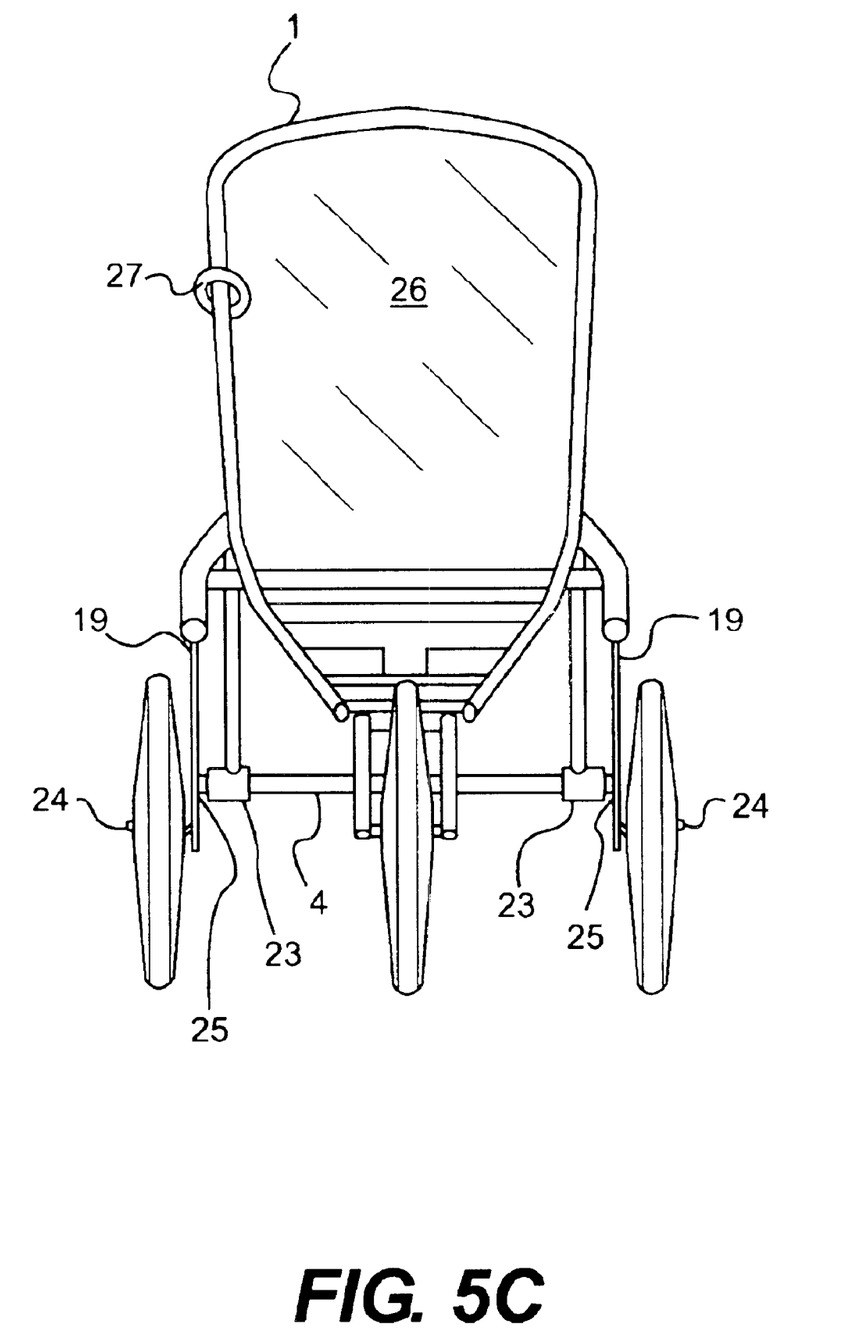
Figure 6A:
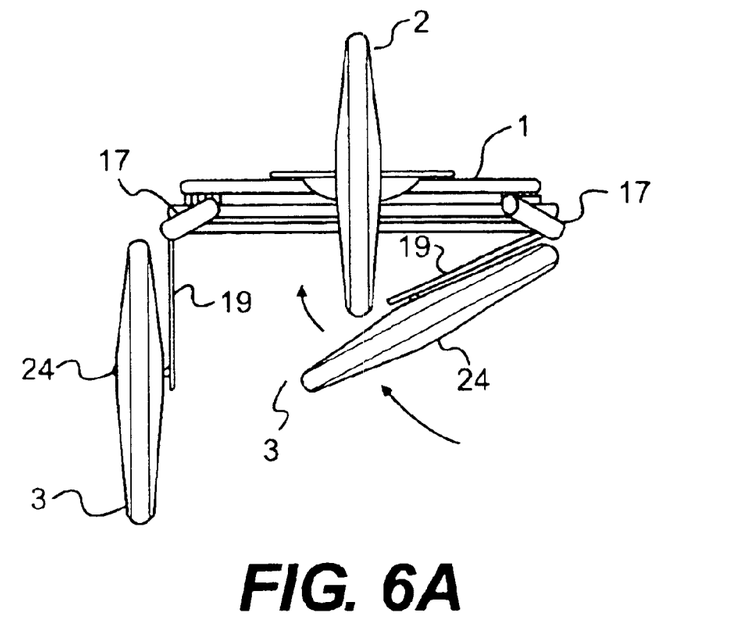
Figure 6B:
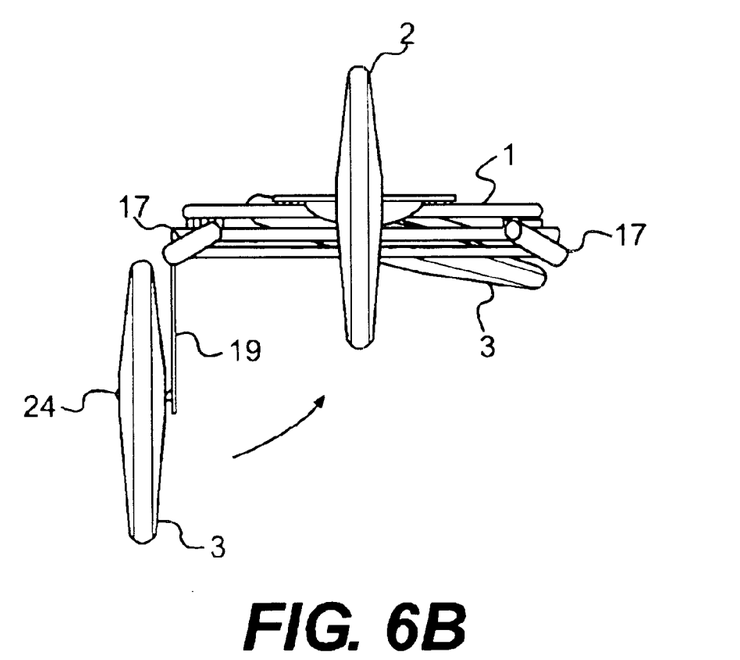
Figure 6C:
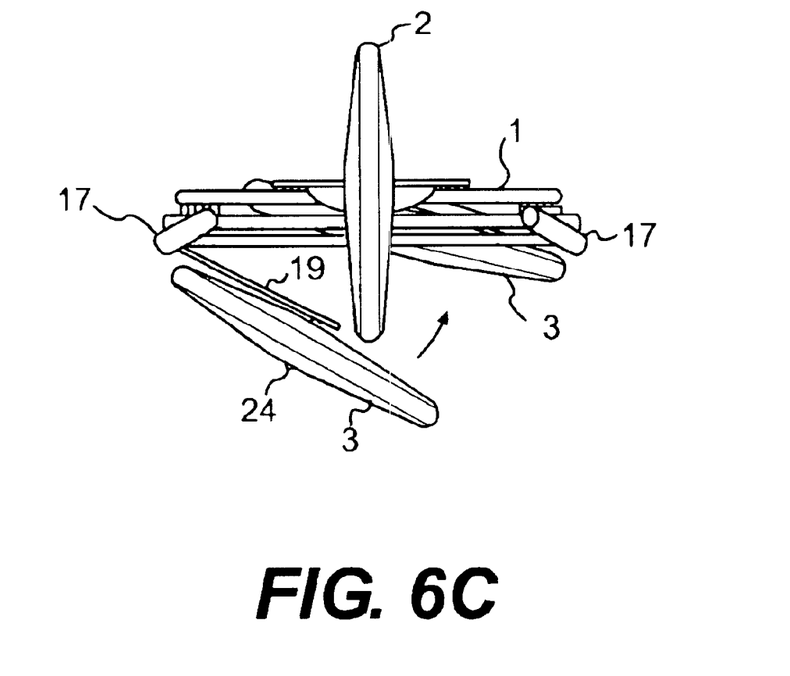
Figure 6D:
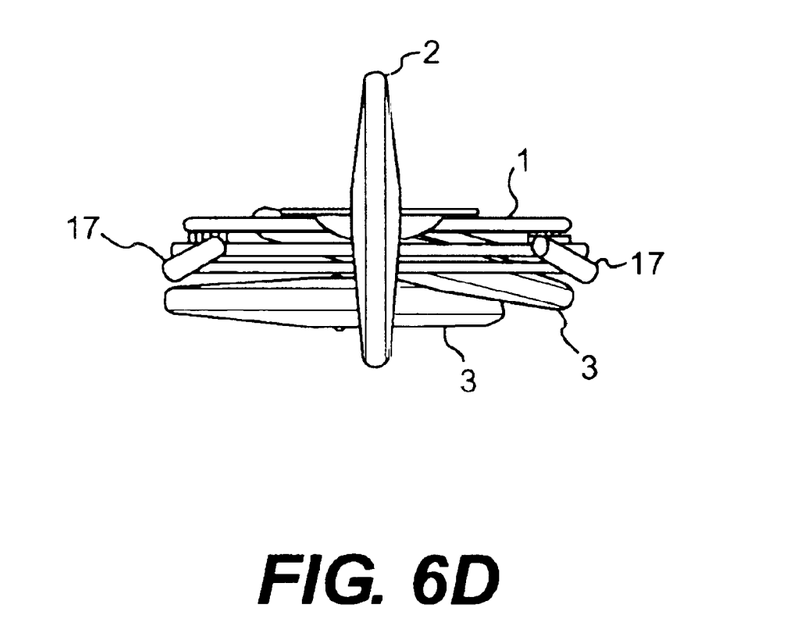
Figure 7A:
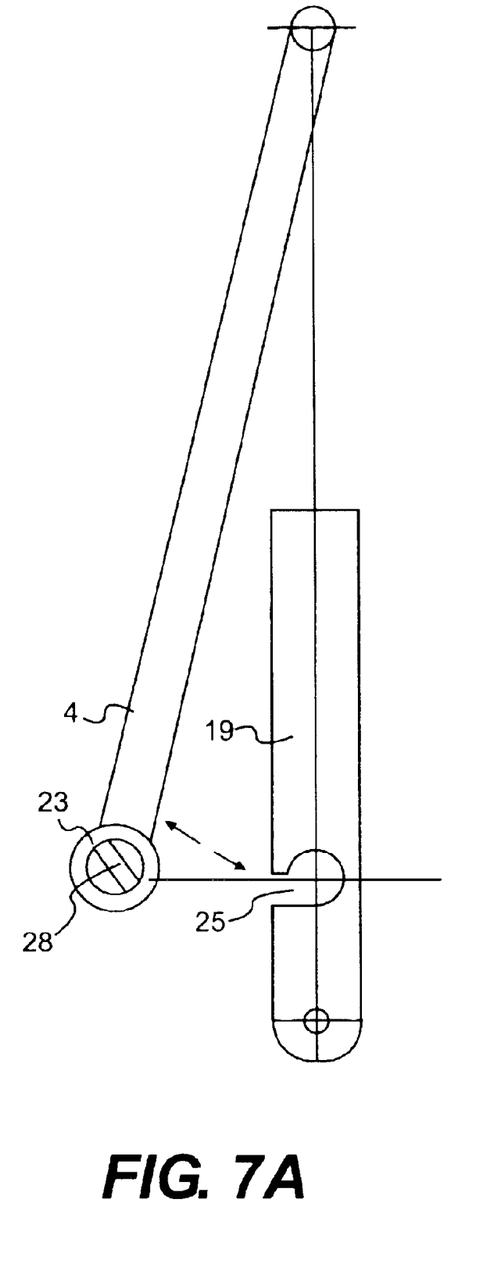
Figure 7B:
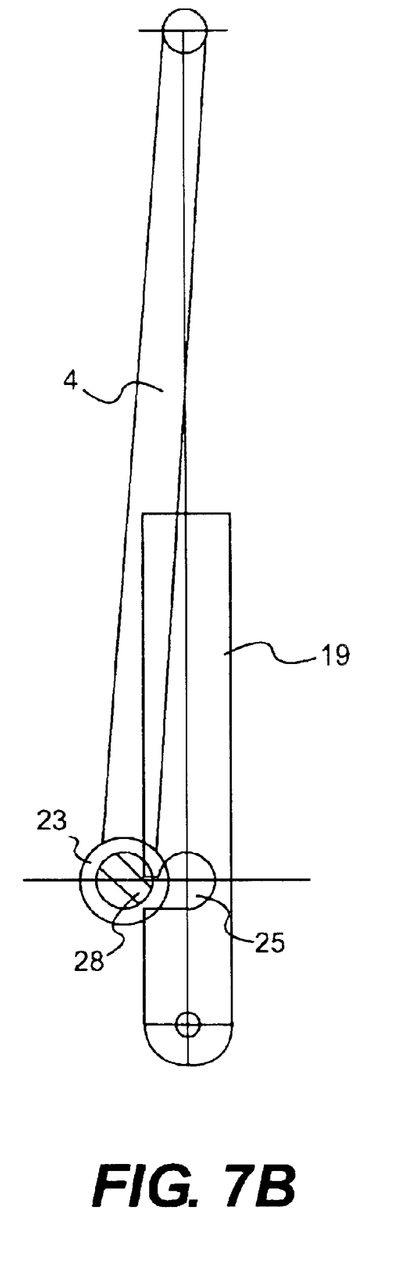
Figure 7C:
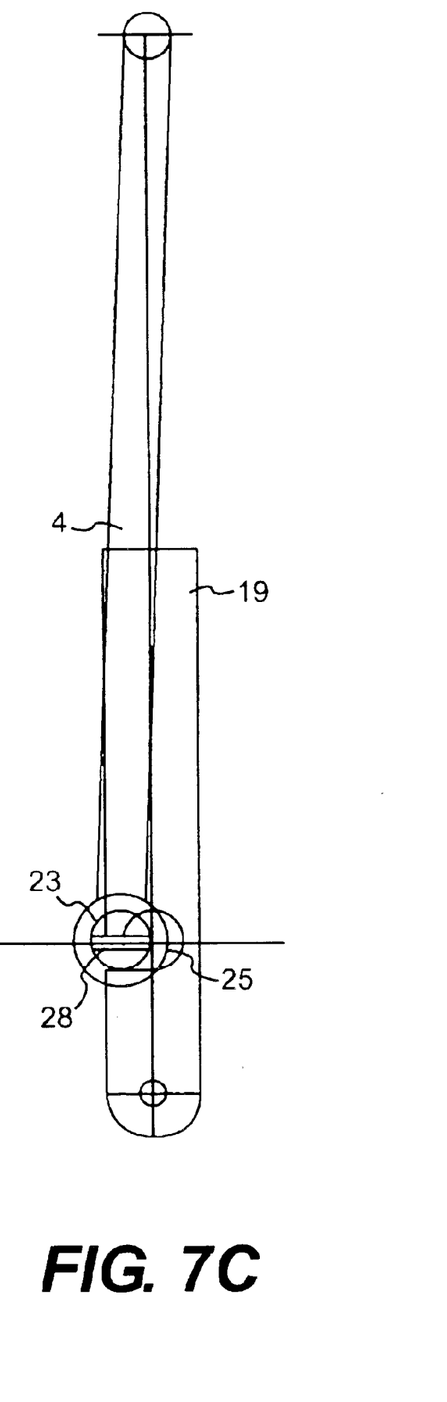
Figure 7D:
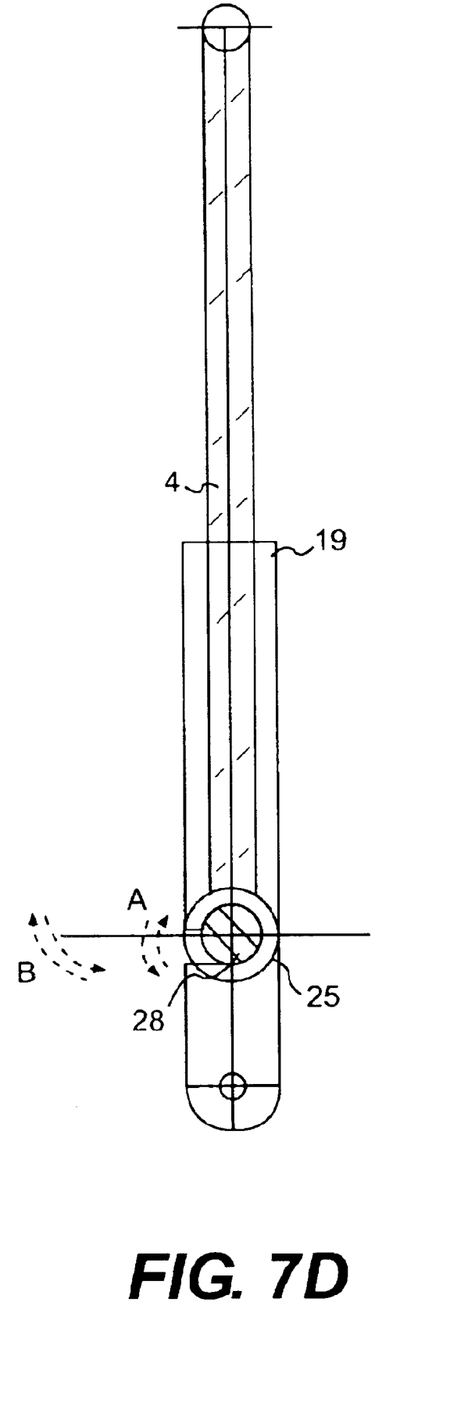

FIGS. 5-A through 5-C help depict mechanisms which allow the rear wheels to be manipulated from the stowed, folded position, to their completely erected position. Referring to FIG. 5-A, a side elevational perspective is shown of the fixed frame (1) with the forward wheel (2) already erected or placed in operative position. In order to erect the rear wheels, the following steps are taken: the user would press, the movable rear wheel support (17) spring bias button (14) located at the extremity of each movable rear wheel support furthest from the fixed frame (1). When said spring bias button (14) is pressed, the user grasps its associated rear wheel (3) and the release button (14) allows the wheel to pivot along its rear wheel pivoting axle (19) approximately 90° so that the rear wheel is erected substantially perpendicular with the axis of the fixed frame (1). The same process is duplicated for the second rear wheel (3). Further referring to FIG. 5-B, the rear wheels have been placed into their perpendicular position, and at this point the user would grasp a suitable portion of the pivoting or floating wheel lateral axle (4) and free the pivoting rear wheel lateral axle from its retainers (30) which hold it in a stowed profile adjacent to the fixed frame (1). The downward movement of the pivoting rear wheel lateral axle (4) causes further retraction of each of the rear wheels (3) because the lateral axle (4) is interconnected with the movable rear wheel support arms (17) by virtue of the pair of interconnection arms (21) so that pivoting the lateral axle (4) downward further causes interaction between other said components. As can be seen in FIG. 5-C at the point where the extremities of the rear wheel lateral axle (4) intersects with the rear wheel pivoting axles (19), the pivoting rear wheel lateral axle connectors (23) contact, and then travel into the rear wheel pivoting axle reception cavities (25) (indicated in FIG. 5-C and shown in more detail in FIGS. 7-A through 7-D below). FIG. 5-C does not show the spring biased latching members on the extremities of the lateral axle (4). Also, in FIG. 5-B is indicated a pivoting rear wheel lateral axle securing ring (29), which is of a cylindrical shape and the user manipulates and rotates about a quarter turn once the pivoting rear wheel lateral axle (4) has engaged and connected to each rear wheel pivoting axle (19) and this rotation of the securing ring serves to further secure the lateral axle (4) into the structure of each rear wheel pivoting axle. FIG. 5-C also indicates at 26 that a flexible seat fabric will be included with the stroller device which will be connected at suitable positions along the fixed frame (1) by virtue of any number of flexible seat fabric retaining members (27). FIG. 5-C also shows the rear wheel pivoting axle tire mounting bolts (24).

Referring to FIGS. 6-A through 6-C, is shown an end elevational perspective looking from front to rear, showing the general stowing of the rear wheels. The rear wheel tires (3) are shown, and in FIG. 6-A, the first of the rear wheels is an intermediate step of being stowed approximately 90° from the operative to the stowed position. First, the user would press the movable rear wheel support spring biased button (14) (not shown), which would permit pivoting of said tire (3) mounted on the rear wheel pivoting axle (19) which component is permitted to pivot along the movable rear wheel support arm (17). Fixed frame (1) is shown as well as the forward wheel (2) in its operative position. In FIG. 6-B, the first of the indicated stowed rear wheels (3) is latched automatically within the side elevational profile of the stroller frame (1) because of automatic reengagement of the latch within the movable rear wheel support (17). FIG. 6-B indicates the pivoting motion of the second rear wheel (3) and FIG. 6-C shows an intermediate pivoting motion of the second rear wheel, followed by FIG. 6-D in which the final rear wheel (3) has attained a completely stowed position, at which point it is automatically latched in said stowed position by virtue of the movable rear wheel support spring biased button and latch within said button (14) which is a part of the movable rear wheel support arm (17).

The series of FIGS. 6-A through 6-D show a stroller embodiment where the rear wheels stow in a sandwiched configuration, but it is appreciated that depending upon the width of the stroller device (a double stroller or jogger) the same folding motion may be accomplished where the rear wheels do not sandwich or overlay each other, but each occupy a side-by-side relationship also substantially within the stowed side elevational profile of the device.

A further alternative embodiment of the rear wheel unfolding function causes an automatic rotational force on the two wheel arms so that the pivoting of the pivoting rear wheel lateral axle (4) not only serves to lower or raise the rear wheels in relation to the fixed frame (1), but further causes the tires to rotate into perpendicular operative position or parallel stowed position in relation to the fixed frame (1). In this application, FIGS. 6-A through 6-D show manual pivoting of the rear wheels, but instead the movable rear wheel support arms (17), as explained earlier, are lowered and raised by motion of the pivoting or floating rear wheel lateral axle (4). However, in this embodiment, not shown, the rotation action of the movable rear wheel support arms (17) creates a further rotational force on the rear wheel pivoting axles (19), which force causes the automatic rotation of the rear wheel pivoting axles (19) either to a stowed, or an operative position. Accordingly, the rear wheels (3) automatically stow in either a sandwiched or an overlaid relationship, or in a side-by-side relationship depending on the overall width dimension of the stroller device.

FIG. 7-A through FIG. 7-D indicate the latching and releasing motion between the pivoting (or floating) rear wheel lateral axle (4) and the rear wheel pivoting axle (19). The lateral extremities of the pivoting rear wheel axle includes connectors (23) which each includes a spring biased latching member (28) which components are received in the rear wheel pivoting axle reception cavities (25) which are a portion of the rear wheel pivoting axles (19). In one representative embodiment of the latching function (although any suitable latching mechanism may be employed), the latching member (28) includes a spring biased mechanism and at the point the connector (23) pivots and arrives at the reception cavity (25), 7-B and 7-C indicate that the latching member (28) turns between 45 to 90° allowing it to then snap back or spring back into a latching position as seen in FIG. 7-D. Accordingly the spring biased function locks the pivoting rear wheel lateral axle (4) into the suitable cavity (25) in the rear wheel pivoting axle (19). In FIG. 7-D the letter "A" indicates that there is a further securement method involving the pivoting rear wheel lateral axle (4) which is actuated by manual rotation of a securing ring (29) which is further seen in FIG. 2 and FIG. 5-D. The ring allows rotation along the pivoting/floating rear wheel lateral axle (4) so that a part of each of the connectors (23) correspondingly rotate axially to engage or disengage the rear wheel pivoting axle (19) between facing portions of the pivoting/floating rear wheel lateral axle (4) itself. Referring back to FIG. 7-D, the user turns the securing ring (29) which is a portion of the pivoting rear wheel lateral axle (4) and the rotation of the ring serves to further secure portions of the pivoting rear wheel lateral axle connectors snugly against the rear wheel pivoting axle (19). The reverse movement of the ring (29) as shown at "A" and then at "B" unlatches or releases the pivoting/floating rear wheel lateral axle (4) from each rear wheel pivoting wheel axle (19) in order to pivot and stow the lateral axle (4).

Although the invention has been described above in relation to preferred embodiments thereof, the invention may be applied to a wide range of miscellaneous wheeled carriers and cargo carriers which include a flexible fabric, a partial movable base, or a retention element mounted to a support frame (aside from stroller devices) and any configuration of single or multiple folding forward or rear wheels, wheel support units, or wheel axle replicating arms may be combined on any such carrier devices. Such carrier variations may include retention elements or partial bases which, in an operative position, occupy a plane parallel with the ground, rather than angular to the rolling surface as is common for stroller devices. It will be understood by those skilled in the art that variations and modifications can be effected in these preferred embodiments without departing from the scope and spirit of the invention.

What is claimed is:

1. A wheeled carrier device, said device comprising:

a support frame defining a side elevational profile and an outer perimeter; and a retention element affixed to said support frame; and a rigid handle structure at least partly melded with said support frame, and at least one forwardmost wheel support unit and at least two rear wheel support units affixed to said support frame, each providing rolling support to said carrier device in their operative position, and each of said wheel support units including a wheel having an outer periphery, and having a central axis of rotation and an arm structure, defining a plane; and said forwardmost wheel being movable between the first, operative position wherein said forwardmost wheel is erected to provide rolling support for said support frame and wherein the plane defined by said forwardmost wheel and said rear wheels extends substantially orthogonally to the side elevational profile of the support frame, and a second, stowed position of said forwardmost wheel, the plane defined by said wheel of said forwardmost wheel support unit being swept through an angle during movement of said wheel support unit between said first and second positions such that the plane defined by said wheel and its central axis of rotation in the second position of said forwardmost wheel support unit is substantially parallel with and substantially within the side elevational profile and outer perimeter of said support frame; and releaseable latching means, for positively latching said forwardmost wheel support unit in both of said first and second positions thereof;

the wheel of the at least one forwardmost wheel support unit, in the first, operative position thereof, being disposed in a plane parallel with the wheels of said rear wheel support units in their operative positions thereof, and being, in use, directed downwardly in said first, operative position thereof, and the wheel of the at least one forwardmost wheel support unit, in the second, stowed position thereof, being directed substantially toward the center of said support frame, and the at least one forwardmost wheel support unit further includes at least one supporting brace at least partly mounted to said forwardmost wheel support unit; and in a first operative position said supporting brace at least partly abuts said support frame, and in a second, stowed position at least a part of said supporting brace is detached from said abutment with to said to support frame.

2. A device in accordance with claim 1 wherein the at least one arm structure of said at least one forward wheel support unit is fixated against axial rotation in said first, operative, latched position and when unlatched from said position, said wheel and said one arm structure of the wheel support unit are rotated at least 90 degrees and moved into the second, stowed position parallel with the support frame, substantially within the side elevational profile of said support frame.

3. A device in accordance with claim 1 wherein at least one part of said brace is at least partly mounted along the underside of the support frame in said first position, causing gravitational force from downwardly applied weight to the retention element affixed to the support frame to maintain said first, operative position of at least one forward most wheel support unit.

4. A wheeled carrier device in accordance with claim 1 wherein the at least one arm structure mounted to said forwardmost wheel is further mounted to a pivot joint; and said joint is further mounted to said support frame; and said joint and said releaseable latching means in said first, operative position, retain said forwardmost wheel of said forwardmost wheel support unit in said operative, in use position substantially parallel with said rear wheels in their operative position; and in an intermediate position, said forward wheel support unit and said arm structure is released from said latch means and both movable on said joint along a substantially vertical plane, and rotatable along an axis of rotation of said joint at least 90 degrees; and in the second, stowed position, said forwardmost wheel is directed inward toward the center of said support frame.

5. A device in accordance with claim 1 wherein the forwardmost wheel, in said operative position, rotates 360 degrees on its axis.

6. A wheeled carrier device in accordance with claim 1 comprising:

a transverse axle replicating unit mounted to said support frame, movable between a first, operative, position, replicating the securement of a transverse axle mounted at least near the central axis of rotation between at least two rear wheel support units providing rolling support, and a second, stowed, position wherein the components comprising said axle replicating unit are parallel with and latched substantially within the side elevational profile of said support frame; and said transverse axle replicating unit includes latching means at least near each of two ends, which latching means are latched and released by at least one operative means located on the transverse axle replicating unit; and in use, when at least two said wheels are in their operative position, and said transverse axle replicating unit is also in the first, operative position, said operative latching means latch said transverse axle replicating unit between said operative wheel support units replicating a transverse axle; and whereby the transverse axle replicating unit operative means are manipulated by the user to effect release of said transverse axle replicating unit from between said wheels and said transverse axle replicating unit is movable to said second, stowed and latched position.

7. A device in accordance with claim 6 wherein movement of the transverse axle replicating unit between said first and second positions causes said wheels of at least two wheel support units to be automatically moved from their said first operative position into said second position parallel with and substantially within the side elevational profile of said support frame of said device, and wherein reverse movement of the transverse axle replicating unit causes reverse movement of said wheels.

8. A wheeled carrier device in accordance with claim 6 wherein the transverse axle replicating unit includes at least one spring-biased latch component, and in the first, operative position of the transverse axle replicating unit, the spring-biasing causes latching of said replicating unit between said operative rear wheel support units.

9. A wheeled carrier device in accordance with claim 6 wherein user movement of the operative means located on the transverse axle replicating unit in said first, operative position causes resilient retention between the latching means on each end of said transverse axle replicating unit and said operative rear wheel support units.

10. A wheeled carrier device in accordance with claim 6 wherein user manipulation of at least one sliding member located along the transverse axle replicating unit latches said unit between at least two operative rear wheel support units.

11. A wheeled carrier device in accordance with claim 6 wherein user rotational movement of said operative latching means located along the transverse axle replicating unit, causes retention between the ends of said unit and said operative rear wheel support units.

12. A wheeled carrier device in accordance with claim 1 wherein in the said second, stowed position of the wheels, all said wheels are affixed to said support frame along a substantially common horizontal plane.

13. A device in accordance with claim 1 wherein the latch means which latches and releases the at least one forward most wheel support unit in both said first and second positions is one and the same means.

14. A device in accordance with claim 1 wherein the forward most wheel support unit latch means is recessed within the side elevational profile of the support frame.

15. A device in accordance with claim 1 wherein the forward most wheel support unit latch means is mounted to the forward most wheel support unit.

16. A device in accordance with claim 1 wherein said forward most wheel support unit latching means include at least one spring-biased latch mounted to the wheel support unit.

17. A device in accordance with claim 1 wherein said forward most wheel support unit latching means include at least one spring-biased latch mounted to the support frame.

18. A device in accordance with claim 1 wherein said forward most wheel support unit latching means include at least one sliding member mounted to the wheel support unit.

19. A device in accordance with claim 1 where said forward most wheel support unit latching means include at least one sliding member mounted to the support frame.

20. A device in accordance with claim 1 wherein said forward most wheel support unit latching means include at least one resiliently movable member mounted to the wheel support unit.

21. A device in accordance with claim 1 where said forward most wheel support unit latching means include at least one resiliently movable member mounted to the support frame.

22. A device in accordance with claim 6 wherein the transverse axle replicating unit automatically latches between at least two wheel support units when said wheel support units are in their first, operative position and the transverse axle replicating unit is also moved to the first, operative position.

23. A device in accordance with claim 1 wherein the at least two rear wheel support units further each include at least one first movable wheel support arm movably mounted to said support frame and at least one second extremity is movably mounted between both said first wheel support arm and the central axis of rotation of at least one wheel.

24. A device in accordance with claim 1 wherein the retention element in the first, operative position forms at least one children's stroller seat that accommodates at least one child, and at least part of the support frame serves as the stroller handle.

25. A device in accordance with claim 1 wherein at least two rear wheel support units are mounted on opposite sides of said support frame, the wheels of said two wheel support units, in the second, stowed, position of said two units, being positioned in at least partially overlapping relation and being disposed at least close to being in a plane parallel with the side elevational profile of the support frame, and at least close to being within the perimeter defined by said support frame.

26. A device in accordance with claim 1 wherein said retention element in the first, operative position retains cargo.

27. A device in accordance with claim 1 wherein said retention element in the first, operative position retains at least one person.

28. A device in accordance with claim 1 further comprising a separable retention element mounted on a forward portion of said device which may be further mounted to a separate wheeled device to thereby couple the devices together for rolling movement.

29. A device in accordance with claim 28 wherein the separable retention element is mounted at least to a portion of the forward most wheel support unit.

30. A device in accordance with claim 1 wherein the wheel and its central axis of rotation, of at least one forward most said wheel support unit, in the second, stowed position of the at least one wheel support unit, is retained in a plane substantially parallel with the side elevational profile of the support frame, and a separable retention element is affixed to both said device and a portion of a separate wheeled device to thereby couple the devices together for rolling movement.

31. A device in accordance with claim 1 wherein the retention element in the first, operative position forms at least one children's stroller seat that accommodates at least one child, and at least part of the support frame serves as the stroller handle.

32. A device in accordance with claim 1 wherein said retention element in the first, operative position retains golfing equipment.

33. A device in accordance with claim 1 wherein said retention element in the first, operative position retains hunting game.

34. A device in accordance with claim 1 wherein said wheel support unit latching means include at least one spring-biased latch mounted to the wheel support unit.

35. A device in accordance with claim 1 wherein said wheel support unit latching means include at least one spring-biased latch mounted to the support frame.

36. A device in accordance with claim 1 wherein said wheel support unit latching means include at least one sliding member mounted to the wheel support unit.

37. A device in accordance with claim 1 where said wheel support unit latching means include at least one sliding member mounted to the support frame.

38. A device in accordance with claim 1 wherein said wheel support unit latching means include at least one resiliently movable member mounted to the wheel support unit.

39. A device in accordance with claim 1 where said wheel support unit latching means include at least one resiliently movable member mounted to the support frame.

40. A wheeled carrier device, said device comprising:

a support frame defining a side elevational profile and an outer perimeter;

a retention element affixed to said support frame which forms a retention surface; and a rigid handle structure at least partly melded with said support frame, and at least one forwardmost wheel support unit and at least two rear wheel support units affixed to said support frame;

each of said wheel support units including a wheel having an outer periphery, defining a plane, and having a central axis of rotation, and said wheel support units each being movable between a first, operative position wherein said wheels are erected to provide rolling support for said support frame and wherein the plane defined by each of said wheels extends substantially orthogonally to the side elevational profile of the support frame, and a second, stowed position, the plane defined by said wheels and said wheel units being swept through an angle during movement of said wheel support unit between said first and second positions such that the plane defined by each of said wheels and their central axis of rotation in the second position of said wheel support units extends parallel with and substantially within the outer perimeter and side elevational profile of said support frame; and the at least two rear wheel support units further each include:

at least one first, movable wheel support arm mounted to said support frame movable in a substantially vertical plane; and at least one second extremity unit is movably mounted at least partially between said first wheel support arm and the central axis of rotation of at least one wheel, said second extremity unit defining a plane; and said second extremity unit is movable between a first, latched, operative position, in which the wheel of said second extremity unit provides rolling support substantially orthogonal to said support frame and a second, stowed, latched position in which the wheel of said second extremity unit is moved at least ninety degrees in the direction toward the center of said support frame; and latching means which positively latch each said second extremity unit and said wheel in said first and second positions; and a transverse axle replicating unit mounted to said support frame including at least one interconnecting arm mounted to at least one said first movable wheel support arm; and said transverse axle replicating unit is movable between the first, operative position replicating the securement of a transverse axle mounted at least near the central axis of rotation between at least two wheels providing rolling support, and a second, stowed position wherein the components comprising said axle replicating unit are parallel with and substantially within the side elevational profile of said support frame; and said transverse axle replicating unit includes latching means at least near each end which latch said transverse axle replicating unit between at least two wheel support units when said wheel support units are in their first, operative position and when the transverse axle replicating unit is also in the first, operative position; and operative means on said transverse axle replicating unit which both latch and release said axle replicating unit between said first, operative wheel operative support units; and latching means which latch and release said transverse axle replicating unit when said unit is in the second, stowed position.

41. A device in accordance with claim 40 wherein movement of the transverse axle replicating unit in the direction of the first, operative position transfers motion between the at least one interconnection arm mounted between said transverse axle replicating unit and the at least one first movable wheel support arm, which motion extends at least part of said first movable wheel support arm in a substantially vertical plane away from the support frame, and reverse movement of the transverse axle replicating unit from at least near the central axis of rotation of said operative rear wheel support units, in the direction toward the support frame, causes retraction of at least part of the said first movable wheel support arm in the direction terminating substantially within the side elevational profile of said support frame.

42. A device in accordance with claim 40 wherein said forwardmost wheel is movable between the first, operative position wherein said forwardmost wheel is erected to provide rolling support for said support frame and wherein the plane defined by said forwardmost wheel and said rear wheels extends substantially orthogonally to the side elevational profile of the support frame, and a second, stowed position of said forwardmost wheel, the plane defined by said wheel of said forwardmost wheel support unit being swept through an angle during movement of said wheel support unit between said first and second positions such that the plane defined by said wheel and its central axis of rotation in the second position of said forwardmost wheel support unit is substantially parallel with and substantially within the side elevational profile and outer perimeter of said support frame; and the at least one forwardmost wheel support unit further includes at least one supporting brace at least partly mounted to said forwardmost wheel support unit; and in a first operative position said supporting brace at least partly abuts said support frame, and in a second, stowed position at least a part of said supporting brace is detached from said abutment to said to support frame; and releaseable latching means, for positively latching said forwardmost wheel support unit in both of said first and second positions thereof.

43. A wheeled carrier device in accordance with claim 40 wherein in the said second, stowed position of the wheels, all said wheels are affixed to said support frame along a substantially common horizontal plane.

44. A device in accordance with claim 40 wherein the forwardmost wheel, in said operative position, rotates 360 degrees on its axis.

45. A device in accordance with claim 42 wherein the at least one forward wheel is fixated against axial rotation in said first, operative, latched position and when unlatched from said position, said wheel is rotated along its axis of rotation and moved into a second, stowed position parallel with the support frame, substantially within the side elevational profile of said support frame.

46. A device in accordance with claim 42 wherein at least one part of said brace is at least partly mounted along the underside of the support frame in said first position, causing gravitational force from downwardly applied weight to the retention element affixed to the support frame to maintain said first, operative forward most wheel support unit position.

47. A device in accordance with claim 40 wherein the retention element in the first, operative position forms at least one children's stroller seat that accommodates at least one child, and at least part of the support frame serves as the stroller handle.

48. A device in accordance with claim 40 wherein at least two wheel support units are mounted on opposite sides of said support frame, the wheels of said two wheel support units, in the second, stowed, position of said two units, being positioned in at least partially overlapping relation and being disposed at least close to being in a plane parallel with the side elevational profile of the support frame, and at least close to being within the perimeter defined by said support frame.

49. A device in accordance with claim 40 wherein said retention element in the first, operative position retains cargo.

50. A device in accordance with claim 40 wherein said retention element in the first, operative position retains at least one person.

51. A device in accordance with claim 40 wherein the transverse axle replicating unit latching means include at least one spring-biased latch means.

52. A device in accordance with claim 40 wherein the transverse axle replicating unit latching means include a manually squeezable component.

53. A device in accordance with claim 40 wherein movement of the transverse axle replicating unit between said first and second positions causes corresponding motion to each of at least two wheel support units, such that when the transverse axle replicating unit is in the first, operative position, each said wheel support unit wheel component is moved to the first, operative position, and when said transverse axle replicating unit is moved to a second, stowed position the wheel which forms a component part of each wheel support unit is at least partly moved closer to said support frame.

54. A device in accordance with claim 40 wherein movement of the transverse axle replicating unit between said first and second positions causes said wheels of at least two wheel support units to be automatically moved from their said first operative position into said second position parallel with and substantially within the side elevational profile of said support frame of said device, and wherein reverse movement of the transverse axle replicating unit causes reverse movement of said wheels.

55. A device in accordance with claim 40 wherein opposing wheels of at least two of said wheel support units, in the second, stowed, position of the at least two wheel support units, are disposed in a plane substantially parallel with the side elevational profile of the support frame.

56. A wheeled carrier device, said device comprising:
 a support frame defining a side elevational profile, a horizontal plane, and an outer perimeter;
 a retention element affixed to said support frame which forms a retention surface; and
 a rigid handle structure at least partly melded with said support frame, and
 at least one forwardmost wheel support unit and two rear wheel support units affixed to said support frame; each of said wheel support units comprising a wheel having an outer periphery, defining a plane and having a central axis of rotation, and said wheel support units each being movable between a first, operative position wherein said wheels are erected to provide rolling support for said support frame and wherein the plane defined by each of said wheels extends substantially orthogonally to the side elevational profile of the support frame, and a second, stowed position, the plane defined by said wheels of said wheel support units being swept through an angle during movement of said wheel support units between said first and second positions such that the plane defined by each of said wheels in the second position of said wheel support units extends substantially parallel, and substantially within the side elevational profile of said support frame, closely contiguous to said retention element, the outer periphery of each of said wheels being disposed substantially within the outer perimeter defined by the support frame in the second position of said wheel support units and the axis of rotation of each of said wheels being disposed wholly within the outer perimeter defined by the support frame in the second position of said wheel support units; and
 releasable latching means, for positively latching said wheel support units in both of said first and second positions thereof,
 the wheel of the at least one forwardmost wheel assembly, in the first, operative position thereof, being disposed in a plane parallel with the wheels of said rear wheel support units in the first, operative positions thereof and being, in use, directed downwardly in said first, operative position thereof, and the wheel of the at least one forwardmost wheel assembly, in the second, stowed position thereof, being directed in an inward direction substantially perpendicular to the inward directions in which the wheels of the rear wheel support units are directed in the second, stowed positions thereof; and
 the at least one forwardmost wheel support unit further includes at least one supporting brace at least partly mounted to said forwardmost wheel support unit; and
 in a first operative position said supporting brace at least partly abuts said support frame, and in a second, stowed position at least a part of said supporting brace is detached from said abutment to said to support frame.

57. A wheeled carrier device in accordance with claim 56 wherein in the said second, stowed position of the wheels, all said wheels are affixed to said support frame along a substantially common horizontal plane.

58. A wheeled carrier device in accordance with claim 56 wherein the at least two rear wheel support units further each include:
 at least one first, movable wheel support arm mounted to said support frame movable in a substantially vertical plane; and
 at least one second extremity unit is movably mounted at least partially between said first wheel support arm and the central axis of rotation of at least one wheel, said second extremity unit defining a plane; and
 said second extremity unit is movable between a first, latched, operative position, in which the wheel of said second extremity unit provides rolling support substantially orthogonal to said support frame and a second, stowed, latched position in which the wheel of said second extremity unit is moved at least ninety degrees in the direction toward the center of said support frame; and latching means which positively latch each said second extremity unit and said wheel in said first and second positions.

59. A device in accordance with claim 56 further including a transverse axle replicating unit mounted to said support frame; and said transverse axle replicating unit is movable between the first, operative position replicating the securement of a transverse axle mounted at least near the central axis of rotation between at least two wheels providing rolling support, and a second, stowed position wherein the components comprising said axle replicating unit are parallel with and substantially within the side elevational profile of said support frame; and said transverse axle replicating unit includes latching means at least near each end which latch said transverse axle replicating unit between at least two wheel support units when said wheel support units are in their first, operative position and when the transverse axle replicating unit is also in the first, operative position; and operative means on said transverse axle replicating unit which both latch and release said axle replicating unit between said first, operative wheel operative support units; and latching means which latch and release said transverse axle replicating unit when said unit is in the second, stowed position.

60. A device in accordance with claim 56 wherein the forwardmost wheel, in said operative position, rotates 360 degrees on its axis.

61. A device in accordance with claim 56 wherein at least one user controlled wheel braking means are mounted to the device.

62. A device in accordance with claim 56 wherein at least one adjustable canopy is mounted to the device.

63. A device in accordance with claim 56 wherein the retention element in the first, operative position forms at least one children's stroller seat that accommodates at least one child, and at least part of the support frame serves as the stroller handle.

64. A device in accordance with claim 56 wherein at least one storage compartment is mounted to the support frame, separable from said retention element, and is selectively removable from the support frame.

65. A device in accordance with claim 56 which includes at least one selectively adjustable safety restraint system designed to restrain a person to the retention element mounted to the support frame.

66. A device in accordance with claim 56 which includes at least one selectively adjustable retention system designed to retain cargo to the retention element mounted to the support frame.

* * * * *